APPARATUS FOR AUTOMATIC SPOKEN PHONEME IDENTICATION

Original Filed June 3, 1960 2 Sheets-Sheet 1

INVENTORS
EDWIN W. SAVAGE
FREDERICK SUMNER HALL

BY Shoemaker and Mattare
ATTORNEYS

INVENTORS
EDWIN W. SAVAGE
FREDERICK SUMNER HALL
BY Shoemaker and Mattare
ATTORNEYS United States Patent Office 3,247,322

Patented Apr. 19, 1966

3,247,322

APPARATUS FOR AUTOMATIC SPOKEN PHONEME IDENTIFICATION

Edwin W. Savage, New York, and Frederick Sumner Hall, Amityville, N.Y.; said Hall assignor to Allentown Research and Development Company, Allentown, Pa., a corporation of Pennsylvania Continuation of application Ser. No. 33,764, June 3, 1960. This application Dec. 27, 1962, Ser. No. 248,838

8 Claims. (Cl. 179—1)

The present invention is a continuation of copending application Serial No. 33,764, filed June 3, 1960, now abandoned.

The present invention relates to methods, means and apparatus for the automatic recognition and identification of spoken phonemes, and is designed to operate accurately with all classes of speakers, including men, women and children, speaking any dialect, at any fundamental pitch, and in the presence of realistic degrees of ambient room noise and telephone circuit noise.

The term "phoneme," as used hereinafter, denotes one unit of the group of basic speech sounds which are used as building blocks to form spoken syllables, spoken words, and spoken language. The Americal may use from 40 to 45 phonemes to utter all of the words of this English language vocabulary in his own regional dialect.

Phonemes may be "voiced" or "unvoiced" (voiceless), the voiced phonemes being produced with the associated activity of the vocal chords and larynx and the unvoiced phonemes being produced without such activity.

The present disclosure treats primarily with the recognition and identification of voiced phonemes. However, the methods and apparatus of the present invention may likewise be practically applied to the recognition and identification of unvoiced phonemes. Accordingly, the use of the term "phoneme" and/or "speech sound" in this application applies equally to both voiced and unvoiced phonemes and to both voiced and unvoiced speech sounds.

Such phoneme recognizing circuits have generally been associated with phonetic typewritres, or with other means, such as a continuous paper tape, either automatically punched or pen inscribed, to yield a progressive symbolic representation of uttered phonemes, which may thus be stored and read visually, or automatically.

It is evident that if the phonemes may be properly recognized, individually, then, the sequence of phonemes occurring in speech may be employed to recognize complete words. This, of course, presupposes that full accommodation is made for dialectal variations which result when different speakers use different combination of phonemes to produce what is intended to be the same word. (The digit 4, for example may be pronounced as "FO," "FOUR," "FOAH," "FO-OO-ER," "FO-UH-ER," etc.)

The automatic recognition of spoken words, such as digit words for example is a highly desirable end result since mechanisms for this purpose could be advantageously employed for automatic telephone dialing systems and for feeding data into data processes computers and the like.

A basic concept as to method, upon which the present invention rests, is that a spoken phoneme may be correctly identified when its formants #1 and #2 are in a prescribed ratio to each other with respect to frequency and amplitude, and when under such condition, the formants themselves appear within prescribed zones of the frequency spectrum.

In the present invention, the prescribed formant frequency ratio is accommodated by the particular band width and frequency limits of the filter means used for the respective phonemes. The prescribed amplitude ratio is accommodated by the particular settings of the amplitude band with switches used for each phoneme. The prescribed spectrum zones are accommodated by the particular filter band widths and their frequency limits.

At the present time, four different formants have been detected for various phonemes, but it is a fundamental feature of the present invention that the characteristics of only two of these formants are important for the purposes of the present invention. The formants themselves are boosted harmonics which differ from the fundamental pitch of the speaker's voice and represent spectral regions of energy concentration. As a practical matter, it is the weighted center frequency of the individual formants which we actually hear and employ for the purpose of identifying different phonemes.

In the present invention, certain particular phonemes can be accurately identified for all classes of speakers under widely varying conditions. In the present disclosure, reference is made to certain vowel phonemes which have been chosen with a view to eventually identifying digits words. It should be clearly understood, however, that the teaching of the invention is equally applicable to all phonemes occurring in the English language and furthermore that the same philosophy can be extended to identifying the phoneme and words of any language other than English.

It will be realized that the primary problem is the approach to the subject of phoneme recognition is the understanding of the complexities of the human speech wave, the present invention employing basically new concepts which are implemented by the utilization of electrical and electronic components, the components being interconnected and inter-associated in an entirely unique and new manner.

The present invention direction directly extracts the weighted center frequencies of the first and second formants for the particular phonemes rather than first attempting to analyze the speech wave for the various harmonics occurring in the first and second formant frequency ranges. In the present case, it is desired to discriminate between 10 different particular phonemes, and in so discriminating there is a certain amount of overlap between the format ferquency ranges of the various phonemes.

As a result, merely separating out the weighted center frequencies of the first and second formants of the various phonemes does not in itself provide sufficient information to accurately identify the phonemes, but an additional amplitude discrimination is required to positively identify one particular phoneme.

In connection with this amplitude discrimination, a unique concept is employed in that it has been found that when the weighted center frequencies of the first and second formants of a particular phoneme are separated out, the amplitudes of both of these weighted center frequencies must lie within a predetermined discrete amplitude range if a certain phoneme has been uttered. Accordingly, utterance of the particular phoneme will cause the two weighted center frequency amplitudes to be in the predetermined ranges, and presence of the phoneme will only be indicated when the amplitudes lie within these particular ranges. If the amplitude of either one of these weighted center frequencies is either greater or less than the predetermined range, some sound other than the particular phoneme must have been uttered, and accordingly, the phoneme will not be recognized.

The present invention relies upon the basic discovery and novel concept that particular phonemes can be accurately identified by obtaining an amplitude discrimination of the weighted center frequencies of the first and second formants of a particular phoneme wherein the amplitude levels of the two formants must lie within a certain band width of amplitude.

It is this basic combination of a separation out of the frequencies of the first and second formants of a particular phoneme, together with a determination of the spectrum zones in which these formant frequencies lie, along with the particular amplitude discrimination of the formant frequencies which detemines whether the amplitudes of the weighted center frequencies lie within a particular amplitude band width which comprises the essence of the present invention.

It is, of course, understood that in this type of an arrangement, the speech wave is firstly translated into a complex electrical wave which accurately reflects the characteristics of the speech wave and varies in accordance with changes in the speech wave itself. In order to implement the invention, the electrical equipment operates upon this varying complex electrical signal to obtain the necessary information.

It is, of course, variations in frequency and amplitude of the complex electrical wave which are actually detected according to the present invention. In connection with the amplitude discriminating feature of the present invention, it is important to provide some sort of control means which provides a relatively constant average amplitude level in the system regardless of the variations in volume of the speech waves uttered by the human speaker. The amplitude levels of the electrical signal in the system are maintained at a substantially constant average level to compensate for any slow variations in loudness of the sounds reaching the transducer of the system.

An object of the present invention is to provide a new and novel method and apparatus for analyzing human speech.

A further object of the invention is to provide a method and apparatus for automatically recognizing and indicating certain particular phonemes occurring in human speech.

Another object of the invention is to provide a method and apparatus for automatically recognizing and indicating certain components of human speech and which is operative for different speakers whether they be men, women or children, and regardless of the particular dialect with which they may speak.

Yet another object of the invention is to provide a method and apparatus for automatically recognizing and indicating spoken phonemes which is satisfactorily operative under all operating conditions which would normally exist in applications where it is desired to recognize human speech.

A still further object of the invention is the provision of a new and novel method and apparatus for automatically recognizing and indicating certain phonemes employed in human speech which is substantially completely accurate, and yet which is simple in operation, and further which is inexpensive and compact in construction.

Other objects and many attendant advantages of the invention will become more apparent when considered in connection with the specification and accompanying drawings, wherein.

Figure 1:
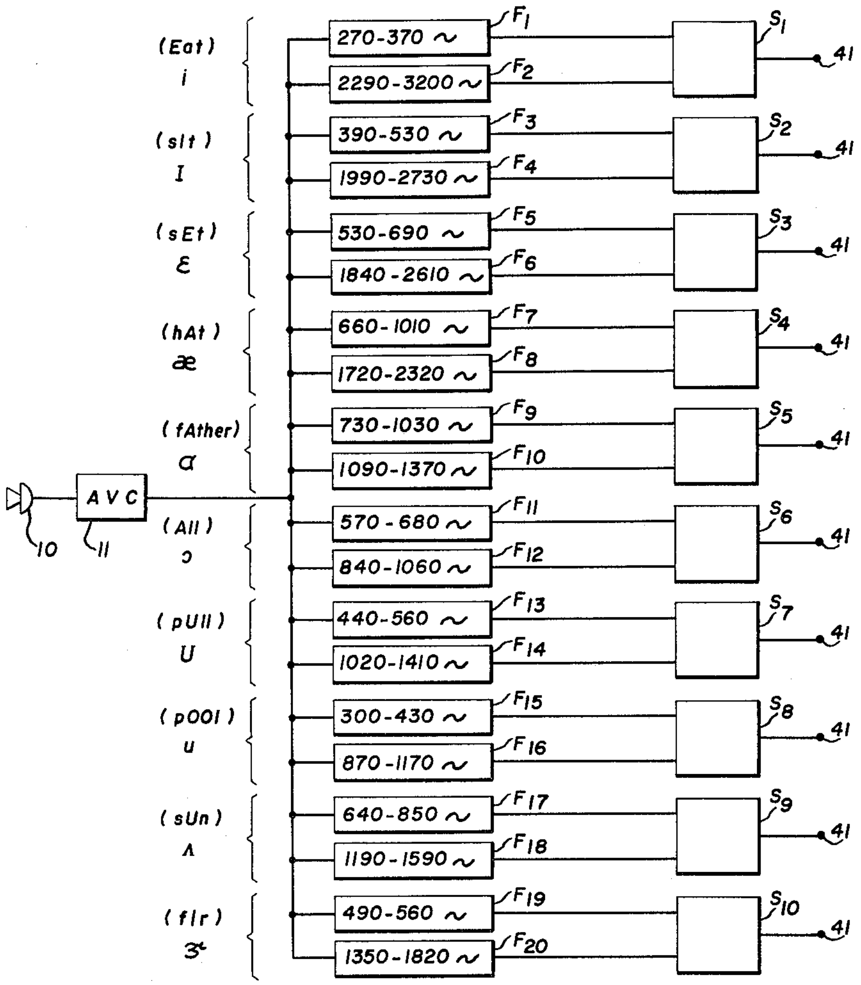
FIG. 1 illustrates in a schematic manner a simplified system for implementing the basic concepts of the present invention.

Referring now to FIG. 1 of the drawings, the system comprises an electrical network having an input 10 in the form of a suitable transducer such as a microphone for converting a speech wave into a complex electrical signal in a well-known manner, the electrical signal carrying in accordance with variations in the sound wave impressed thereon. It is, of course, apparent that member 10 may be of any type of energy converter for converting sound vibrations, mechanical vibrations or light variations into electrical variations. It is also apparent that various other types of transducers may be substituted for microphone 10, and that the transducer is adapted to convert any source of electrical signal representing the speech wave which may in turn also be employed as an input to the system.

The output of energy converter 10 is connected with an automatic volume control means indicated by reference numeral 11 which may be of the well-known conventional "Vogad" (voice operated gain adjusted device) type for reducing to a constant level in its output, waves of various levels applied to its input and coming from different talkers or input sources of different energy levels. The "Vogad" may be typically of the type as disclosed in U.S. Patent 2,019,577 issued November 5, 1935. The "Vogad" amplifies the waves to a varying degree to compensate for any slow variations in the loudness of the sounds reaching the pick-up whereby a relatively constant average amplitude level is maintained from the output of the means 11 and accordingly, the average amplitude level in the electrical network remains substantially constant.

The output of the automatic volume control circuit is connected to a plurality of phoneme recognizing circuits, all of which are connected in parallel with one another. As mentioned previously, 10 particular phonemes have been selected as being adequate for identifying digit words, and accordingly, the invention network includes 10 phoneme recognizing circuits for automatically identifying and recognizing the particular selected phonemes. It is evident that the number of phoneme recognizing circuits can be increased as desired in accordance with the number of phonemes which it is desired to recognize.

Each of the 10 phoneme circuits as seen in FIG. 1 includes a pair of band pass filters having the outputs thereof connected to a common amplitude switch. The various phoneme recognizing circuits for the different phonemes are indicated by the brackets on the left of this figure. For example, the pair of filters $F^1$ and $F^2$ and the connected amplitude band width switch $S^1$ comprise the phoneme recognizing circuit for the phoneme i (Eat). In a like manner, the pair of filters $F^3$ and $F^4$ connected to the common amplitude band width switch $S^2$ comprise the phoneme recognizing circuit for the phoneme I (sIt).

In a similar manner, the pairs of filters $F^5$ and $F^6$, $F^7$ and $F^8$, $F^9$ and $F^{10}$, $F^{11}$ and $F^{12}$, $F^{13}$ and $F^{14}$, $F^{15}$ and $F^{16}$, $F^{17}$ and $F^{18}$, $F^{19}$ and $F^{20}$ are connected to the common amplitude switch means $S^3$, $S^4$, $S^5$, $S^6$, $S^7$, $S^8$, $S^9$ and $S^{10}$ respectively. As indicated by the brackets, each phoneme recognizing circuit including a pair of parallel connected filters and a common amplitude switch means is provided for recognizing and indicating a single particular phoneme, the various phonemes being indicated adjacent the brackets.

Each of the filters $F^1$ through $F^{20}$ are of relatively conventional construction and are commonly referred to as band pass filters, the filters preferably having a characteristic such that a flat passing band is provided with a sharp cut-off or attenuation. These band pass filters will each separate out from the incoming complex wave a sub-band of frequencies having a selected frequency range which can be adjusted in a well-known manner. The frequency ranges employed in the various filters is a very important feature of the present invention. As discussed previously, a basic concept of the present invention is the fact that each phoneme recognizing circuit separates out the weighted center frequencies of the first and escond formants of the particular phoneme. Accordingly, the band pass characteristics of the different filters are selected in accordance with the frequency ranges of the weighted center frequencies of the formants of the different phonemes.

The frequency ranges of filters $F^1$, $F^3$, $F^5$, $F^7$, $F^9$, $F^{11}$, $F^{13}$, $F^{15}$, $F^{17}$ and $F^{19}$ are designed such that these filters will pass the weighted center frequencies of the first formant of the respective phonemes. On the other hand, the frequency range of filters $F^2$, $F^4$, $F^6$, $F^8$, $F^{10}$, $F^{12}$, $F^{14}$, $F^{16}$, $F^{18}$ and $F^{20}$ are selected such that they pass the weighted center frequencies of the second formant of the respective phonemes. These values in cycles per second have been indicated on the various filters as seen in the drawings.

Referring now to Table I, the manner in which the frequency band width of the various filters is chosen may be clearly understood. Table I indicates the weighted center frequencies of the first and second formants of the particular phonemes which are employed in the illustrative example of a network according to the present invention shown in FIG. 1.

The last two lines of Table I indicate the amplitudes of the weighted center frequencies of the first and second formants, the line identified as $L^1$ indicating the level in decibels for the first formant and the line indicated by $L^2$ indicating the level in decibels for the second formant. The amplitudes set forth herein are the peak amplitudes corrected for over-all response of the measuring system. The amplitudes of the formants do not differ significantly for different classes of speakers, and accordingly, the amplitudes have all been averaged together for various types of speakers. The formant amplitudes are all referred to the amplitude of the first formant of the phoneme ɔ (All) wherein the amplitude of the first formant of this phoneme is assigned the value of 0 decibels.

The outputs of each pair of filters in the various phoneme recognizing circuits are connected to a common amplitude band switch, the purpose of which is to identify the phoneme by passing a control voltage only when the amplitudes of the outputs of the two associated filters both lie within a discrete amplitude range. One form of amplitude switch is illustrated in more detail in FIG. 2, it being understood that this is merely an illustrative example, and that the amplitude switch may take many different forms.

TABLE I

*Formant weighted center frequencies and formant amplitudes of particular phonemes*

| Phonemes | Eat i | sIt I | sEt ϵ | hAt æ | fAther α | All ɔ | pUll U | pOOl µ | sUn ʌ | fIr ɝ |
|---|---|---|---|---|---|---|---|---|---|---|
| Fundamental Frequencies, c.p.s.: | | | | | | | | | | |
| Men | 136 | 135 | 130 | 127 | 124 | 129 | 137 | 141 | 130 | 133 |
| Children | 272 | 269 | 260 | 251 | 256 | 263 | 276 | 274 | 261 | 261 |
| First Formant Weighted Center Frequency, c.p.s.: | | | | | | | | | | |
| Men | 270 | 390 | 530 | 660 | 730 | 570 | 440 | 300 | 640 | 490 |
| Children | 370 | 530 | 690 | 1,010 | 1,030 | 680 | 560 | 430 | 850 | 560 |
| Second Formant Weighted Center Frequency, c.p.s.: | | | | | | | | | | |
| Men | 2,290 | 1,990 | 1,840 | 1,720 | 1,090 | 840 | 1,020 | 870 | 1,190 | 1,350 |
| Children | 3,200 | 2,730 | 2,610 | 2,320 | 1,370 | 1,060 | 1,410 | 1,170 | 1,590 | 1,820 |
| Formant Weighted Center Frequency Amplitudes (db): | | | | | | | | | | |
| L1 | −4 | −3 | −2 | −1 | −1 | −0 | −1 | −3 | −1 | −5 |
| L2 | −24 | −23 | −17 | −12 | −5 | −7 | −12 | −19 | −10 | −15 |

It will, of course, be understood that the band width of the various filters must be selected to pass the weighted center frequencies for all classes of speakers including men, women and children. With this in mind, it is evident that the frequency of the weighted center frequencies for men will lie at the lower end of the band width range and the frequency of the weighted center frequencies for children will lie at the upper end of the frequency range with the frequencies for women lying somewhere in between these values.

In each of the columns under the various phonemes in Table I, the frequency range for the weighted center frequencies for the first and second formants of the respective phonemes are indicated. Reading across the first line under the phonemes, the average fundamental frequencies for men and children are indicated when uttering the different phonemes. Reading across the next horizontal line, the frequency of the first formants are tabulated. Reading across the next horizontal line, the frequency ranges of the weighted center frequencies of the second formant of the respective phonemes are indicated. The values appearing for the frequency ranges of the weighted center frequencies of the first and second formants of the respective phonemes as indicated in Table I correspond to the values indicated on the filters in FIGS. 1 and 3 of the drawings. In other words, reading vertically downwardly under the phoneme i (Eat), the frequency range for the weighted center frequency of the first formant lies between 270 and 370 cycles per second and the frequency range for the weighted center frequency of the second formant lies in the range of 2290 to 3200 cycles per second. In a corresponding manner, the frequency ranges for all of the phonemes are similarly tabulated in Table I.

Figure 2:
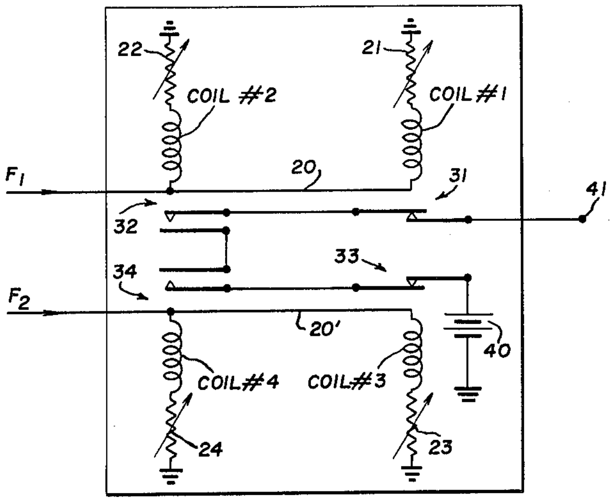
FIG. 2 is a schematic view illustrating one form of amplitude switch means which can be employed in the system shown in FIG. 1 for example.

Referring now to FIG. 2, the output of filter $F^1$ passes along a lead 20 and thence to ground through coil #1 and coil #2 through the adjustable resistors 21 and 22 respectively. Coil #1 is the operating coil of a relay indicated generally by reference numeral 31, the contacts of which are normally biased to closed position as shown. Coil #2 is the operating coil of a relay generally indicated by the reference numeral 32, the contacts of which are normally biased to open position as shown.

The output of filter $F^2$ passes through a lead 20′ and thence to ground through coil #3 and coil #4 and adjustable resistors 23 and 24 respectively. Coil #3 is the operating coil of a relay indicated generally by reference numeral 33, the contacts of which are normally biased to closed position as shown and coil #4 is the operating coil of a relay indicated generally by reference numeral 34, the contacts of which are normally biased to open position as shown.

One of the contacts of relay 33 is connected to a source of control voltage indicated by a battery 40. The output of the amplitude switch is indicated by a terminal 41, and when the predetermined conditions are met, a control voltage will appear at terminal 41. It will be evident to one skilled in the art that the control voltage appearing at terminal 41 may be utilized in many different manners for actuating various mechanisms when a phoneme is recognized. For example, the control voltage may be used for actuating a phoneme typewriter, a punch tape, or various other types of recording devices.

It will also be evident in the construction shown in FIG. 2 that a control voltage can only appear at terminal 41 when the contacts of all four of the relays are closed, the contacts of the two relays 32 and 34 normally being biased to an open position as shown. As discussed previously, the amplitudes of the outputs from filters $F^1$ and $F^2$ must be within a predetermined discrete range for a particular phoneme, and only when the amplitudes are in this discrete range does the amplitude switch indicate recognition of the phoneme by producing a control voltage at terminal 41.

Accordingly, the operating voltage values for coils #1 through #4 are chosen such that the control voltage at terminal 41 can occur only when the outputs from filters $F^1$ and $F^2$ are in the particular selected amplitude range. The operating voltage values of coil #2 and coil #4 are therefore selected such that when the amplitude of the respective inputs thereto reach the lower end of the amplitude range, the contacts of relays 32 and 34 respectively will be actuated to closed position. It is evident that only when the contacts of both relays 32 and 34 have been closed will a control voltage appear at terminal 41.

The operating voltage values of coils #1 and #3 are selected such that when the inputs thereto reach the upper end of the amplitude range, the contacts of the respective relays will open. In this manner, when the amplitude level exceeds the upper end of the amplitude range, the contacts of relays 31 and 33 respectively will be opened thereby preventing a control voltage from appearing at terminal 41. It is accordingly evident that only when the amplitude levels of the outputs of filters $F^1$ and $F^2$ are both simultaneously within the predetermined respective amplitude ranges, will a control voltage appear at terminal 41. If the amplitude level of the control signal from either filter $F^1$ or filter $F^2$ is above or below the respective discrete amplitude range, the contacts of one of the relays 31–34 will be opened thereby preventing a control signal from appearing at terminal 41 thereby not recognizing the particular phoneme.

Each of the amplitude switches $S^1$ through $S^{10}$ may be of substantially identical construction, the only difference being that the amplitude ranges for the various phonemes will vary and accordingly the resistors 21–24 will be adjusted to control the operation of the respective relays so that the contacts thereof will open and close at different operating voltage values in accordance with the selected amplitude range.

It will, of course, be understood that in the switches employed in the system shown in FIG. 1, the relays will be of the type which are sensitive to alternating current since the output voltages from each of the filters is of an alternating current characteristic.

Referring now to Table II, the decibel values given in the last two horizontal lines of Table I have been translated into relative values in millivolts. It will be noted that the first formant value of the phoneme ɔ (All) was given a value of 0 decibels in Table I, and has been given a value of 1 millivolt in Table II as an average value. The average values for the amplitude level of each of the phonemes indicate the relative comparison to the amplitude of the first formant of the phoneme ɔ (All). To obtain the desired discrete range within which the amplitude level for the formants of the respective phonemes must lie, values have been selected either plus or minus 15 percent on either side of the average values.

TABLE II

*Voltage range (millivolts) for first and second formants*

| Phonemes | Eat | sIt | sEt | hAt | fAther | All | pUll | pOOl | sUn | fIr | |
|---|---|---|---|---|---|---|---|---|---|---|---|
| First Formant (Millivolts): | | | | | | | | | | | |
| Maximum | .726 | .814 | .912 | 1.024 | 1.024 | 1.15 | 1.024 | .814 | 1.024 | .647 | Coil #1. |
| Average | .631 | .708 | .793 | .890 | .890 | 1.00 | .890 | .708 | .890 | .563 | |
| Minimum | .536 | .602 | .674 | .756 | .756 | .85 | .756 | .602 | .756 | .479 | Coil #2. |
| Second Formant (Millivolts): | | | | | | | | | | | |
| Maximum | .072 | .082 | .162 | .289 | .647 | .513 | .289 | .129 | .363 | .205 | Coil #3. |
| Average | .063 | .071 | .141 | .251 | .563 | .446 | .251 | .112 | .316 | .178 | |
| Minimum | .054 | .060 | .120 | .213 | .479 | .379 | .213 | .095 | .269 | .151 | Coil #4. |

Accordingly, as seen in Table II, the maximum values listed are 15 percent on the high side of the average value while the minimum values listed are 15 percent on the low side of the average values. The maximum and minimum figures represent the limits of the range within which the amplitude of the formant signals should lie in order to indicate recognition of the particular phonemes.

As indicated in Table II, the maximum values for the first and second formants represent the voltage in terms of millivolts at which coils #1 and #3 respectively of the various amplitude switches should cause the relays 31 and 33 respectively to open. On the other hand, the values listed for coils #2 and #4 in Table II represent the values in terms of millivolts at which coils #2 and #4 will be set to cause closing of relays 32 and 34 respectively.

Applying Table II to the system shown in FIG. 1, the system will be adjusted such that the first formant of the phoneme ɔ (All) will produce a peak amplitude of one millivolt at the output of filter $F^{11}$. When the system is so adjusted, the peak amplitudes of the remaining phonemes for the first and second formants should lie within the indicated amplitude ranges. This condition will hold true where the filters are provided with similar band pass characteristics for attenuation losses. Accordingly, the coils #1 through #4 of the amplitude switches may be adjusted to cause operation of the associated relays upon the occurrence of a voltage of the particular value listed in Table II. It will, of course, be understood that resistors 21–24 may be employed for so adjusting coils #1–#4 respectively.

Considering one specific example for the phoneme i (Eat), coil #1 will be set to open relay 31 when the output from filter $F^1$ reaches an amplitude level of .726 millivolt and coil #2 will be set to cause closing of relay 32 when the amplitude level of the output of filter $F^1$ reaches .536 millivolt. Coil #3 will be set to cause opening of relay 33 when the amplitude level of the output of filter $F^2$ reaches a value of .072 millivolt, and coil #4 will be adjusted to cause closing of relay 34 when the amplitude level of the output of filter $F^2$ reaches .054 millivolt. In a like manner, the remaining relays of the amplitude switch are adjusted in accordance with the values listed in Table II.

Figure 3:
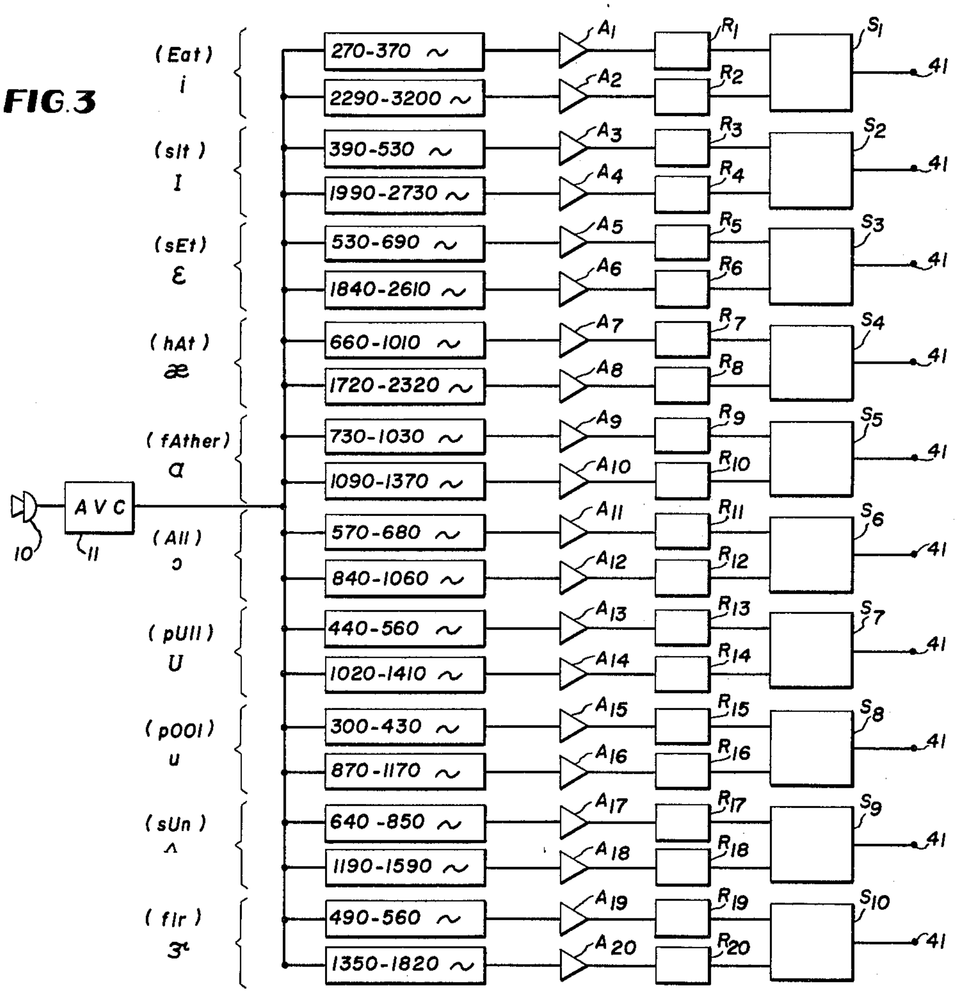
FIG. 3 illustrates a schematic view of another more sophisticated form of the system for carrying out the present invention.

Referring now to FIG. 3 of the drawings, a modification of the network shown in FIG. 1 is illustrated. The pick-up, volume control means, and filter means are identical with that shown in FIG. 1. However, the outputs of each of the filters passes firstly through an amplifier and then through a rectifier prior to being fed into the amplitude switch means which may be similar to that shown in FIG. 2.

The modification shown in FIG. 3 is considered to be a more practical approach than that shown in FIG. 2 since it permits the utilization of relays which are operated by direct current rather than alternating current. In order to minimize the expense involved in providing the large number of relays, it is preferred that the relays operate on substantially the same voltage. With this arrangement, substantially identical relays may be used throughout the system thereby providing uniformity and ease of manufacture and construction of the various relays. This permits relays having uniform operating characteristics to be used throughout the various switches and eliminates the necessity of individually adjusting each of the operating coils for different values as was discussed in connection with the amplitude switch shown in FIG. 2.

In order to accomplish this desired end result, the amplifiers $A^1$ through $A^{20}$ are adjusted in a unique manner. For the sake of illustration, let it be assumed that it is desired to raise the average amplitude levels for the first and second formants as shown in Table II up to the same level of 10 volts. Accordingly, the gain of the individual amplifiers will be set such that the individual average values as seen in Table II for the first and second formants of each individual phoneme will be raised to 10 volts. In other words, if a signal comes out of one of the formant filters at the average value indicated in Table II, the signal appearing at the associated amplitude switch will be 10 volts.

The rectifiers $R^1$ through $R^{20}$ connected in series with amplifiers $A^1$ through $A^{20}$ respectively provide a D.C. signal at the amplitude switch. Each of the rectifiers $R^1$ through $R^{20}$ may be provided with an associated low pass filter in a well-known manner to smooth out the output of the rectifiers, and/or to provide a suitable time constant for the operation of the relays.

In this modification wherein the amplifiers $A^1$ through $A^{20}$ are adapted to raise the average voltage level of the formants to the level of 10 volts, the relays of the amplitude switch are set to operate at a range of $\pm 15$ percent on either side of this value. In other words, referring again to FIG. 2, when considering the output from filter $F^1$, if the value reaches 8.5 volts, the contacts of relay 32 will close and when the value reaches or exceeds a value of 11.5 volts, the contacts of relay 31 will open. The operation of relays 34 and 33 are similar to those of relays 32 and 31 respectively.

It will be apparent that the same basic considerations apply to the systems shown both in FIGS. 1 and 3, but that the modification illustrated in FIG. 3 is a more commercially feasible system wherein the operation of the various relays are set at only two different voltage values and may be substantially uniform in construction. In either case, the operation will be the same, and the control voltage will appear at the output terminals only when the amplitude levels of the outputs of the two band-pass filters of each phoneme recognizing circuit are both simultaneously within the predetermined amplitude range.

Figure 4:
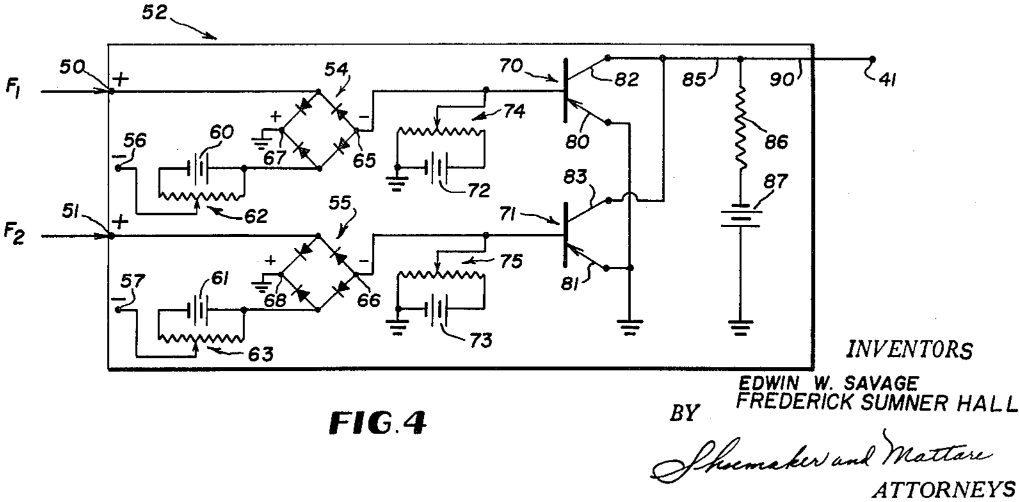
FIG. 4 illustrates a modified form of amplitude band width switch which may be employed in the present invention.

Referring now to FIG. 4 of the drawing, a modified form of amplitude switch is illustrated which serves the same function as shown in FIG. 2, but possesses certain inherent advantages thereover. The amplitude switch shown in FIG. 4 employs transistors rather than relays as shown in FIG. 2 thereby substantially reducing the size of the amplitude switch and further eliminating all mechanical motion.

A further important advantage of the amplitude switch as shown in FIG. 4 is the fact that extremely good accuracy can be obtained in so far as amplitude discrimination is concerned, and the discrete amplitude ranges can be very carefully adjusted.

It is assumed for the purpose of illustration that the switch means illustrated in FIG. 4 is substituted for the switch $S^1$ as shown in FIG. 3. The outputs of filters $F^1$ and $F^2$ after being amplified and rectified as shown in FIG. 3 by amplifiers $A^1$, $A^2$ and rectifiers $R^1$ and $R^2$, are indicated as being connected with the terminals 50 and 51 respectively of this switch indicated in its entirety generally by reference numeral 52. Terminals 50 and 51 are in turn connected to full wave rectifiers 54 and 55 respectively in a well-known manner.

It is assumed that the voltage of positive polarity appears at terminals 50 and 51 and the corresponding negative voltage from the associated rectifiers $R^1$ and $R^2$ are impressed upon the terminals 56 and 57 respectively. Batteries 60 and 61 are connected with the other input terminal of the full wave rectifiers 54 and 55 respectively. Batteries 60 and 61 are connected with potentiometers indicated generally by reference numerals 62 and 63 respectively which are in turn connected to terminals 56 and 57 respectively.

The purpose of potentiometers 62 and 63 is to provide a recognition or acceptance voltage value to the rectifiers of an opposite polarity to the input through terminals 50 and 51 respectively. In the example discussed in FIG. 3, it is assumed that when the proper average amplitudes for the particular phoneme occur at the output of filters $F^1$ and $F^2$, these amplitudes will be amplified and rectified to a level of 10 volts, direct current. Therefore, potentiometers 62 and 63 will be adjusted to provide a voltage of 10 volts. With this arrangement, an input of 10 volts of a positive polarity will be nullified by the 10 volts of the negative polarity from the battery, thereby providing no output voltage from rectifiers 54 and 55. When the value of the voltage appearing at terminals 50 and 51 is above or below the level of 10 volts, a signal will appear at terminals 65 and 66 respectively which will always have a negative polarity. Terminals 65 and 66 are in turn each connected with the base of transistors indicated generally by reference numerals 70 and 71 respectively. Transistors 70 and 71 are of the conventional PNP type. Terminals 67 and 68 of rectifiers 54 and 55 respectively are connected to ground. Also connected with the base of transistors 70 and 71 are batteries 72 and 73 respectively through potentiometers indicated generally by reference numerals 74 and 75 respectively.

The negative sides of batteries 72 and 73 are connected to ground as shown. The potentiometers 74 and 75 are employed for applying an adjustable positive bias on the base of the transistors.

The emitters 80 and 81 of transistors 70 and 71 respectively are connected to one another and to ground. The collectors 82 and 83 of transistors 70 and 71 respectively are connected to one another and through a lead 85 and a load resistor 86 to a control voltage supply in the form of a battery 87 which is in turn connected with ground. The output terminal 41 is connected to the control voltage source 87 through a lead 90.

The operation of the amplitude switch shown in FIG. 4 may now be considered. As discussed previously, any variations in the voltage output from the filters $F^1$ and $F^2$ will result in corresponding amplification and rectification of these changes which will be reflected at terminals 50 and 51. As pointed out, when the outputs of filters $F^1$ and $F^2$ are at the proper average value for the particular phoneme, 10 volts will appear at terminals 50 and 51. The batteries 60 and 61 including potentiometers 62 and 63 are adjusted to produce a recognition or acceptance voltage of 10 volts. As the amplitude level of the output of filters $F^1$ and $F^2$ varies from the average values shown in Table II, a negative signal will appear at terminals 65 and 66 which will be impressed upon the base of the transistors 70 and 71 respectively.

Potentiometers 74 and 75 are adjusted to provide a positive bias on the transistors which prevents the transistors from conducting. When neither of the transistors are conducting, a control signal will appear at output terminal 41 from the control voltage source 87.

Potentiometers 74 and 75 are adjusted in this particular case to provide a positive bias voltage of one and one-half volts which represents a difference of 15 percent from the 10 volt value, it being realized that either plus or minus values of 15 percent with respect to the 10 volts will always appear as a negative voltage at terminals 65 and 66.

Accordingly, should the negative voltages appearing at either terminals 65 or 66 reach or exceed a level of one and one-half volts, the transistor will begin to conduct. As soon as either transistor 70 or 71 starts to conduct, the control voltage 87 will be shorted out to ground through the loud, or limiting, resistor to thereby prevent a control voltage from appearing at terminal 41.

It is evident from the foregoing description that the amplitude switch shown in FIG. 4 will produce the same end result as that shown in FIG. 2, but does incorporate certain advantageous features not obtainable with the mechanical switch means of FIG. 2.

It should be understood that various other types of switches will occur to one skilled in the art for accomplishing the amplitude band width discrimination obtained by the two illustrated examples shown in FIGS. 2 and 4. The amplitude band width switch of the present invention assists in the prevention of false read-outs during periods of interphoneme "glide," wherein the various phonemes to be recognized are affected by the immediately preceding phoneme and the immediately following phoneme. In addition, various types of filter means may be employed for separating out the sub-bands as long as the proper band pass characteristics are obtained. Furthermore, since there is an overlap in the frequency ranges of the weighted center frequencies of certain phonemes, it may be feasible to employ a common filter for one or more formants of different phonemes under certain conditions.

When employing the system of the present invention for reading out phonemes and providing a permanent record thereof, it may be desirable to cause one amplitude switch when actuated to indicate a phoneme to lock out the remaining switches until a read-out is accomplished whereupon the switches can all again be freed for subsequent operation.

While the automatic volume control means of the present invention has been shown as interposed before all of the filter means, it should be noted that this volume control means can be inserted in the network at any point before the signal enters the amplitude switch means. It is, of course, important that before the signals are fed into the amplitude switch means, they will be of a substantially constant average level regardless of the volume of the human speaker.

An important consideration regarding an invention of this nature is the fact that neither in philology nor linguistics is there any agreement as to the precise boundary limits of any phoneme. The teaching of the present invention is directed to what is considered the most universally accepted phonetic values now attached to certain sounds occurring in the English language. The 10 phonemes discussed in connection with the present invention are generally accepted as being true phonemes distinguishable from one another, and the values listed in Tables I and II for the frequency and amplitude of the first and second formants of these phonemes are generally accepted in the art. While there may be some small variations from these figures, it is not the intention of the present disclosure to be restricted to the particular precise limits set forth in Tables I and II since it may well be found upon subsequent investigations that these limits may vary somewhat from those provided in these tables.

It is clear that the present invention is not to be limited by any arbitrary limits which may now exist regarding the frequency and amplitude ranges, but that the teaching of the invention can readily be extended in accord ance with subsequent discoveries of slight variations in these frequency and amplitude limits.

It will, of course, also be understood that various combinations of filter means and amplitude switches may be employed. When utilizing the amplitude switches as shown in FIGS. 2 and 4, for example, it is preferable to first rectify the electrical signal, but as illustrated in FIG. 1, such rectification is not necessary in all cases. Additionally, the utilization of the amplifiers is largely for practical economic reasons and is not necessary to carry out the invention.

We claim:

1. Apparatus for automatically indicating the presence of a particular phoneme in human speech comprising means for generating an electrical signal which varies in accordance with variations in the human speech to be analyzed, and a plurality of frequency selective devices connected to said last-mentioned means, each of said frequency selective devices separating out a sub-band of frequencies, each of said sub-bands having a frequency range including the weighted center frequencies of one of the formants of a particular phoneme, and an amplitude discriminating switch means connected to a plurality of said frequency selective devices, said amplitude switch means including a first means for sensing the presence of the amplitude level of the electrical output of one of said filter devices within a first predetermined amplitude range, said switch means including a second means for sensing the presence of the amplitude level of the electrical output of another of said filter devices within a second predetermined amplitude range, said first and second means of the switch means being operatively associated to indicate the presence of the particular phoneme only when the first and second means of the switch means sense the associated signals as being within the particular ranges.

2. Apparatus as defined in claim 1, wherein the output of each of said filter devices is connected to the input of an amplifying means and the output of said amplifying means is connected to a rectifier means, the output of the rectifier means being connected to said amplitude switch means.

3. In a system for automatically recognizing and indicating the presence of phonemes as uttered in human speech, means for receiving a speech wave and generating a complex electrical signal varying in accordance with variations in the speech wave impressed thereon, said system including a plurality of phoneme identification circuits connected to said last-mentioned means and in parallel with one another, each of said phoneme circuits including a pair of parallel connected filter means, each of said filter means being so constructed and arranged as to separate out from the complex wave a sub-band having a particular frequency range, the frequency range of one of the filters in each of the phoneme identification circuits including the weighted center frequencies of the first formant of a particular phoneme for all classes of speakers, the frequency range of the other of the filters in each of the phoneme identification circuits including the weighted center frequencies of the second formant of the particular phoneme for all classes of speakers, the outputs of the pair of filters in each phoneme identification circuit being connected to a common amplitude switch means, the amplitude switch means of each phoneme identification circuit being independently operable of the other amplitude switch means, each of said amplitude switch means including a first means for detecting the presence of an amplitude level within a certain discrete range from the output of one filter means of the associated phoneme identification circuit, said switch means also including a second means for detecting the presence of an amplitude level within a certain discrete range from the output of the other filter means of the associated phoneme identification circuit, said first and second means of each switch means being interconnected with one another to automatically indicate the presence of a particular phoneme only when the first and second means of the switch means simultaneously detect the presence of signals from the associated filters within the predetermined discrete ranges.

4. Apparatus as defined in claim 3, including means connected in said system for maintaining the output signals impressed upon each of the switch means at a substantially constant average level regardless of the volume of the speech impressed upon the system.

5. Apparatus for automatically recognizing and indicating the presence of certain particular phonemes as may be uttered in human speech comprising means for rereceiving a speech wave and generating a complex electrical signal varying in accordance with variations in the speech wave, controlling the amplitude level of the electrical signals in the apparatus such that the average level thereof remains substantially constant regardless of variations in the energy at the speech wave source, a plurality of band-pass filters connected in parallel with one another and means for impressing said complex electrical signal on each of said band-pass filters, a plurality of phoneme identification circuits each including at least two of said band-pass filters and a common amplitude switch means connected to the plurality of filters of the particular phoneme identification circuit, one of the filters of each phoneme identification circuit passing a band of frequencies including the weighted center frequencies of the first formant of the particular phoneme, another filter of each of the phoneme identification circuits passing a band of frequencies including the weighted center frequencies of the second formant of the particular phoneme, each of said amplitude switch means including a first means operatively connected to one of the filters of the associated circuit and a second means operatively connected to another filter of the associated circuit, said first means being operative to pass a control signal when the amplitude level of the output of the associated filter lies within a first discrete range, said second means being operative to pass a control signal when the amplitude level of the output of the associated filter lies within a second discrete range, said first and second means being connected in series such that a control signal indicating the presence of the particular phoneme is allowed to pass only when the amplitude levels of the ouputs of the filters connected with the amplitude switch means are within the said discrete ranges.

6. Apparatus as defined in claim 5, wherein the output of each of said filters is connected to the input of an amplifying means, the output of the amplifying means being connected to the input of a rectifier means, and the output of the rectifier means being connected to said amplitude switch means.

7. Apparatus as defined in claim 5, wherein the first means and the second means of said amplitude switch means each includes a pair of relays, one of said relays normally being biased to a closed position and the other of said relays normally being biased to an open position, said relays each including an operating coil, said operating coils being connected in parallel.

8. Apparatus for automatically recognizing spoken phonemes comprising means for generating a compex electrical signal varying in accordance with variations in human speech, a plurality of band pass filter means connected to said last-mentioned means for separating out sub-bands from said complex electrical signal, a first one of said filter means having a band-pass range including the weighted center frequencies of the first formant of a particular phoneme, a second one of said filter means having a band-pass range including the weighted center frequencies of the second formant of the particular phoneme, the outputs of said first and second filter means being operatively connected to the input teminals of a common amplitude band width switch means, said amplitude band width switch means including a first transistors and a second transistor, each of said transistors including a base, an emitter, and a collector, adjustable means for impressing a bias voltage on the base of each of said transistors, an output control signal terminal operatively connected with said transistors and a source of control voltage connected to said transistors and to said control signal terminal, full wave rectifier means, a regulated power supply operatively connected with said rectifier means, and the ouput of said rectifier means being connected to the base of said transistors.

References Cited by the Examiner

UNITED STATES PATENTS

| | | | |
|---|---|---|---|
| 2,181,265 | 11/1939 | Dudley | 179—1 |
| 2,183,248 | 12/1939 | Riez | 179—1 |
| 3,037,077 | 5/1962 | Williams | 179—1 |

FOREIGN PATENTS

| | | |
|---|---|---|
| 724,478 | 2/1955 | Great Britain. |

OTHER REFERENCES

Campanella: A Survey of Speech Bandwidth Compression Techniques, IRE Transactions on Audio, September, October 1958, pp. 104–116.

Crabbe: Electronics to the Phonetician, Wireless World, June 1959, pp. 289–294.

ROBERT H. ROSE, *Primary Examiner.*